APPARATUS FOR FORMING WIRE CONTROL ELEMENTS

Original Filed Jan. 23, 1967 6 Sheets-Sheet 1

INVENTOR.
Maurice H. Brown,
BY
Parker & Carter
Attorneys.

APPARATUS FOR FORMING WIRE CONTROL ELEMENTS

Original Filed Jan. 23, 1967 6 Sheets-Sheet 2

INVENTOR.
Maurice H. Brown,
BY
Parker & Carter
Attorneys.

APPARATUS FOR FORMING WIRE CONTROL ELEMENTS

Original Filed Jan. 23, 1967 6 Sheets-Sheet 5

INVENTOR.
Maurice H. Brown,
BY
Parker & Carter
Attorneys.

APPARATUS FOR FORMING WIRE CONTROL ELEMENTS

Original Filed Jan. 23, 1967 6 Sheets-Sheet 4

INVENTOR
Maurice H. Brown,
BY
Parker & Carter
Attorneys.

APPARATUS FOR FORMING WIRE CONTROL ELEMENTS

Original Filed Jan. 23, 1967 6 Sheets-Sheet 5

INVENTOR.
Maurice H. Brown,
BY
Parker & Carter
Attorneys.

APPARATUS FOR FORMING WIRE CONTROL ELEMENTS

Original Filed Jan. 23, 1967 6 Sheets-Sheet 6

INVENTOR.
Maurice H. Brown,
BY
Parker & Carter
Attorneys.

United States Patent Office

Re. 27,398
Reissued June 20, 1972

27,398

APPARATUS FOR FORMING WIRE CONTROL ELEMENTS

Maurice H. Brown, Palos Heights, Ill., assignor to Azonic Products Inc., Palos Heights, Ill.

Original No. 3,527,637, dated Sept. 8, 1970, Ser. No. 611,112, Jan. 23, 1967, which is a division of Ser. No. 347,725, Feb. 27, 1964. Application for reissue Oct. 7, 1970, Ser. No. 78,828
Int. Cl. B32b *31/18, 31/06*
U.S. Cl. 156—510 5 Claims

Matter enclosed in heavy brackets [ ] appears in the original patent but forms no part of this reissue specification; matter printed in italics indicates the additions made by reissue.

ABSTRACT OF THE DISCLOSURE

A wire impedance forming assembly wherein a turntable receives a first paper disc and the disc receives a sunburst-wound strand on a ring, a vacuum plate holds a second disc over an adhesive bath, an applicator element rises from the bath to apply adhesive to the second disc, a pressure nozzle on the plate is actuated to break any film of adhesive thus formed, the plate is pivoted over the turntable to place the second disc, adhesive side down, over the strand and first disc and a press moves onto the second disc to press the two discs and strand together as the turntable rotates, a cutter moving into the area adjacent the turntable to cut the strand from the ring.

*This is a division of my copending application, Ser. No. 347,725, filed Feb. 27, 1964, and now U.S. Patent No. 3,323,960.*

Spools of wire are widely used in a variety of industries. In many circumstances a wire is removed axially of a spool, i.e. across the end plate of a spool, and a resulting tendency exists in the wire to curl and to become distorted. Accordingly, means have been provided to impede, to a very limited extent, the freedom of the wire as it traverses the periphery of the end wall of the spool. Such impedance, however, is limited to that just sufficient to prevent curling and distortion of the wire while permitting free removal thereof from the spool. The impedance element includes a plurality of radially extending thin, flexible members through which the wire is forced as it leaves the spool. Since such impedance elements are accessories, it is important to reduce the cost of manufacture thereof and to increase its volume production. Accordingly, it is one purpose of the present invention to provide a method for rapid, economical volume production of such impedance elements.

Another purpose is to provide a method and means of forming wire impedance elements from a single length of flexible plastic strand.

Another purpose is to provide a means and method of forming wire impedance elements of substantial uniformity from element to element.

Another purpose is to provide a method of forming a wire impedance element having substantial uniformity among impeding members thereof.

Another purpose is to provide a means and method of forming a wire impedance element which shall be relatively free of human error in manufacture.

Another purpose is to provide a means and method of forming a wire impedance element which shall be effective to form the entire element.

Other purposes will appear from time to time during the course of the specification and claims.

The invention is illustrated more or less diagrammatically in the accompanying drawings wherein.

Like parts are indicated by like numerals throughout the specification and drawings.

Figure 1:
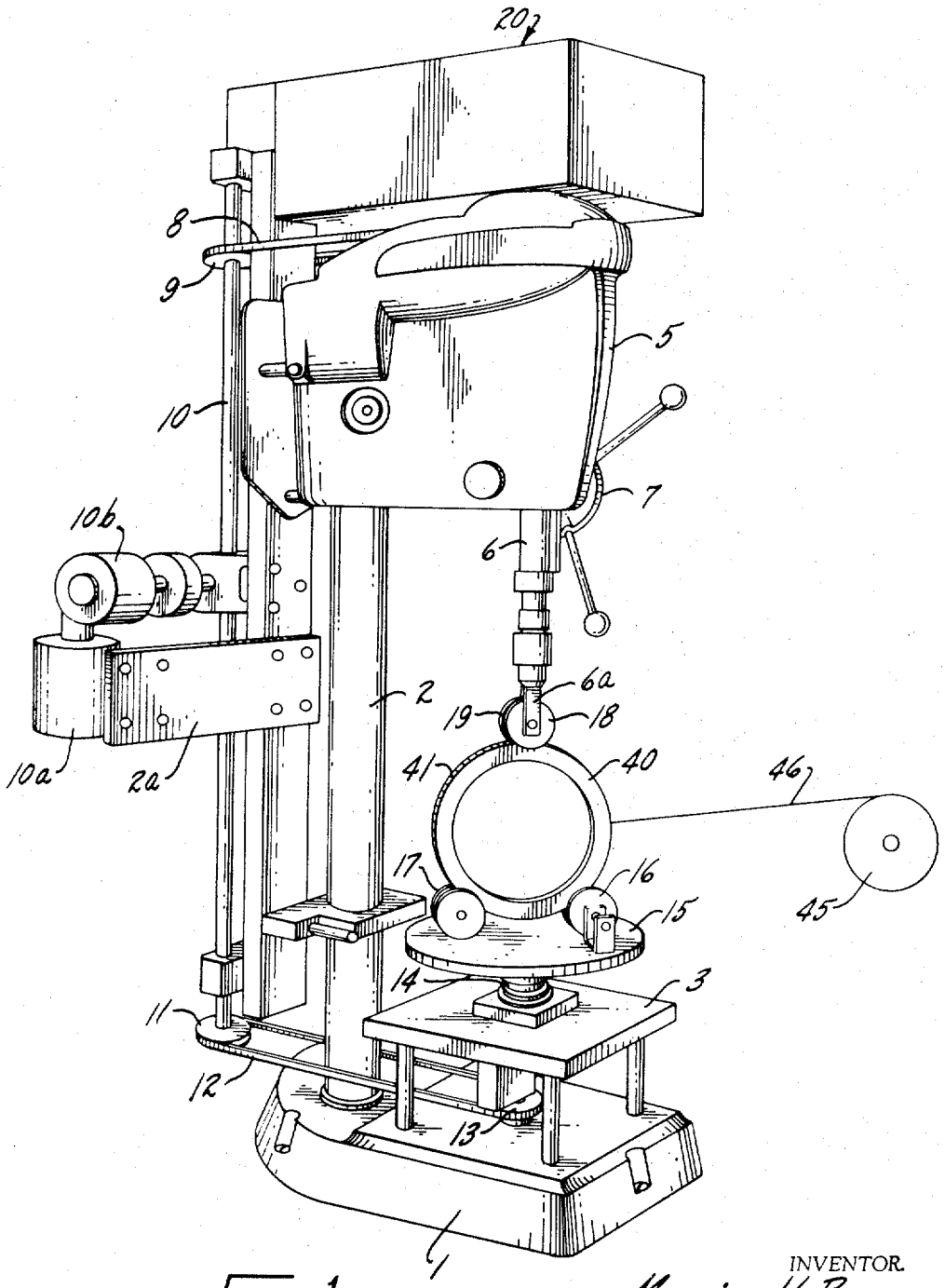
FIG. 1 is a perspective view.

Referring now to the drawings, and particularly to FIG. 1, the numeral 1 indicates a base. Upstanding on the base 1 is a standard 2.

A table 3 is supported, in upwardly spaced relation from and on the base 1 by a plurality of supports 4. Mounted on the standard 2 above the base 1 and table 3 is a housing structure 5. A shaft 6 is carried by the member 5 for relative vertical movement therewith, the shaft 6 extending from the member 5 toward the base 1 above platform 3. A manually operable handle structure 7 is carried by the structure 5 and engages the shaft 6 for movement thereof toward and away from the platform 3. A continuous drive member 8 extends from the structure 5 and engages a pulley element 9, it being understood that the member 8 may take the form of a continuous belt or a continuous chain and that the same engages a similar pulley or sprocket (not shown) forming a part of the structure 5 in driving relationship with the member 8. The pulley or sprocket 9 is secured to a vertical shaft 10 which parallels, in spaced relationship, the standard 2.

Adjacent a lower portion of the shaft 10 is a pulley or sprocket 11 which is in turn engaged by a second continuous drive member 12. A third pulley or sprocket member 13 is rotatably mounted on base 1 and is engaged by the member 12.

Power drive mechanism 10a may be suitably supported adjacent an intermediate segment of shaft 10, as by the support 2a, and may drivingly engage the shaft 10 through any suitable clutching or speed-reducing assembly such as that indicated at 10b. It will be realized, also, that the structure 5 may carry the appropriate drive mechanism without departing from the nature and scope of the invention.

Figure 3:
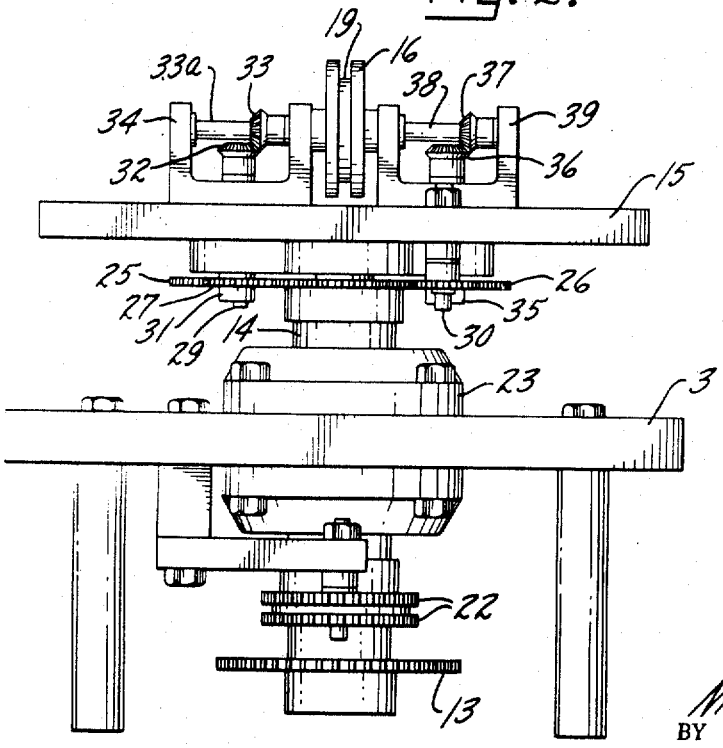
FIG. 3 is a side view of the structure illustrated in FIG. 2.

The member 13 has a driving engagement with a shaft 14 which in turn extends rotatably through platform 3 for rotation of a plate 15 in a plane upwardly spaced from platform 3. A pair of drive wheels 16, 17 are positioned in diametrically spaced, aligned relationship on the plate 3. An idler wheel 18 is rotatably carried by the lower end 6a of shaft 6 and lies in the plane of wheels 16, 17. As may be best seen in FIGS. 1 and 3, each of the wheels 16–18 has a circumferential peripheral groove 19.

Illustrated schematically at 20 in FIG. 1 is a suitable control mechanism. Since the details of the particular controls or control mechanism employed form no part of the invention itself and since a variety of forms of control means may be employed without departing from the nature and scope of the invention, the control structure 20 will not be further illustrated or described.

Figure 2:
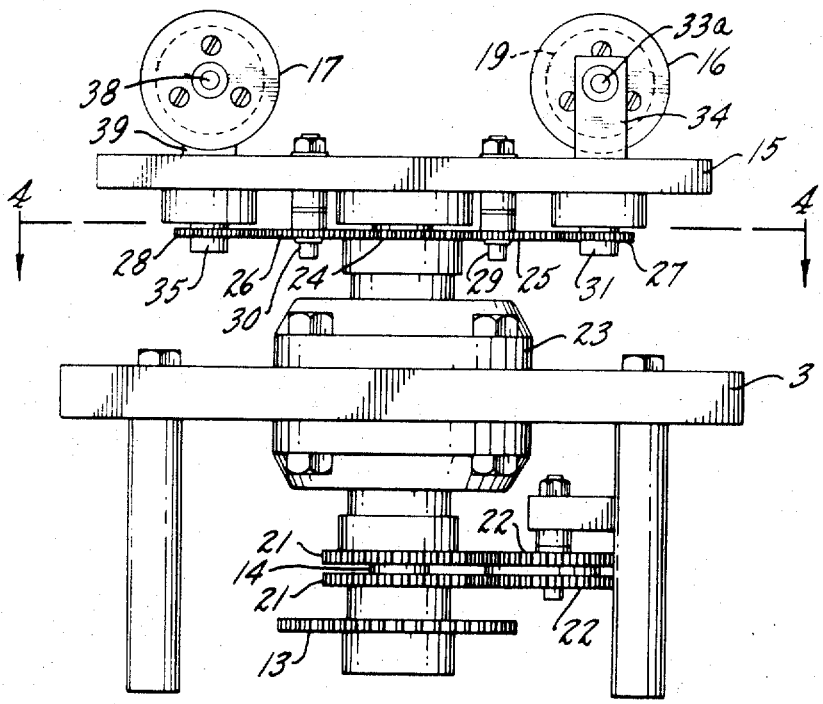
FIG. 2 is an end view, on an enlarged scale, of a portion of the structure illustrated in FIG. 1.
Figure 4:
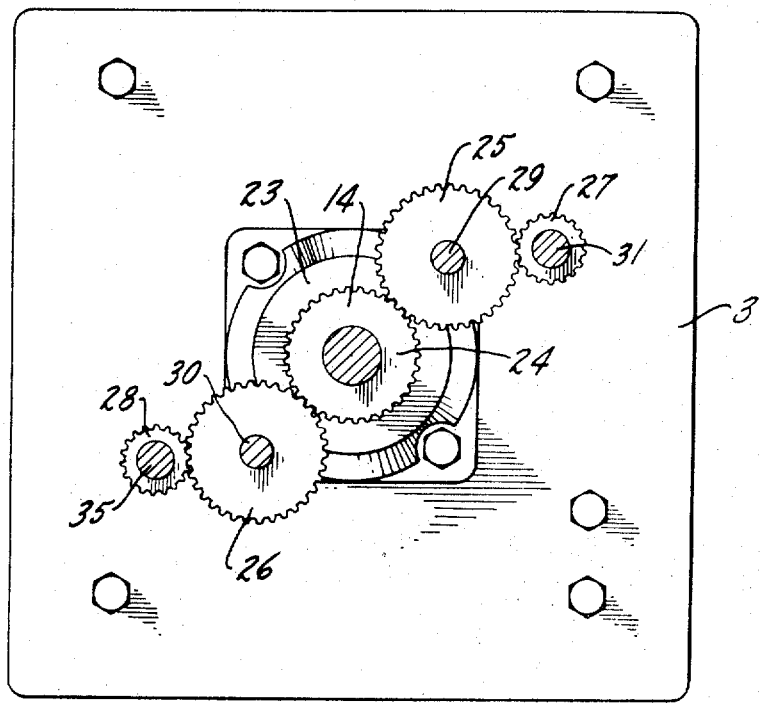
FIG. 4 is a view taken on the line 4—4 of FIG. 2.
Figure 6:
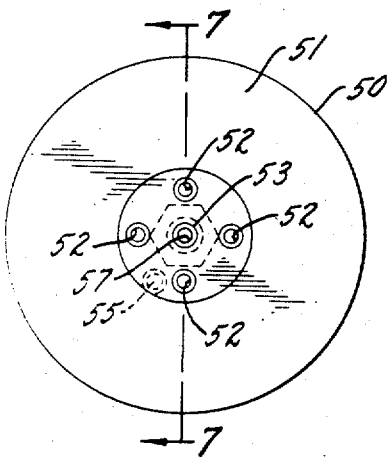
FIG. 6 is a detailed bottom view of a vacuum plate element in a transfer portion of the invention.
Figure 7:
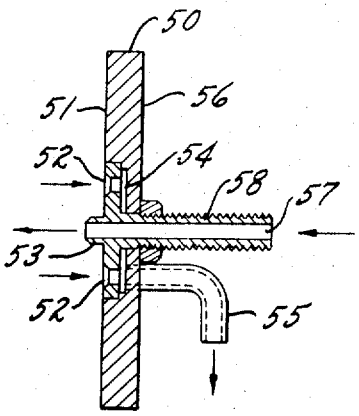
FIG. 7 is a view taken on the line 7—7 of FIG. 6.

Referring now to FIG. 2, it will be seen that the sprocket 13 engages the shaft 14 adjacent the lower portion thereof. The shaft 14 carries, spaced above the sprocket 13, a set of gears 21 which in turn engage a corresponding set of idler gears 22. The shaft 14 extends upwardly through a bearing member 23 carried by the platform 3. A gear 24 is positioned above the platform 3. As may be best seen in FIGS. 2, 3 and 4, the gear 24 engages a set of gears 25, 26. The gears 25, 26 in turn engage, respectively, the gears 27, 28. The gears 25 and 26 are carried respectively, by shafts 29, 30 which are in turn mounted on plate 15. Gear 27 is carried by a shaft 31 rotatably mounted in and extending upwardly through plate 15. The shaft 31 carries, at its upper end, an angle gear 32. The gear 32 engages an angle gear 33 on a shaft 33a mounted for horizontal rotation above plate 15 on a bracket 34 carried by plate 15. The shaft 33 in turn carries the wheel 16 for rotation therewith. Similarly, a shaft 35 is secured to gear 28 and extends rotatably, upwardly through plate 15, carrying an angle gear 36 in engagement with an angle gear 37 on a shaft 38. Shaft 38 is mounted for horizontal rotation in a bracket 39 carried on the upper surface of plate 15 and the shaft 38 carries at its outer end for rotation therewith the wheel 17. Above the gear 24 the shaft 14 carries the plate 15 for rotation with the shaft 14.

A hollow, flat ring 40 has its outer peripheral edge serrated as indicated at 41. The ring 40 is of a thickness sufficient to seat within the grooves 19 and the wheels 16–18, whereby the sides of the grooves 19 receive a portion of the flat annular surfaces of the ring 40 and, as appears below, grooves 19 are wide enough to receive said surfaces with a plastic strand on each side of ring 40. It will be observed also that the opposite annular surfaces of the ring 40 are of limited radial extension to provide a major open area within the ring 40.

Figure 5A:
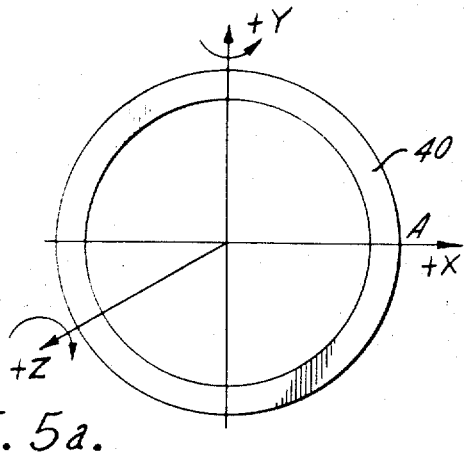
FIGS. 5a–5f are diagrammatic views illustrating steps in the formation of a portion of the impedance element.
Figure 5B:
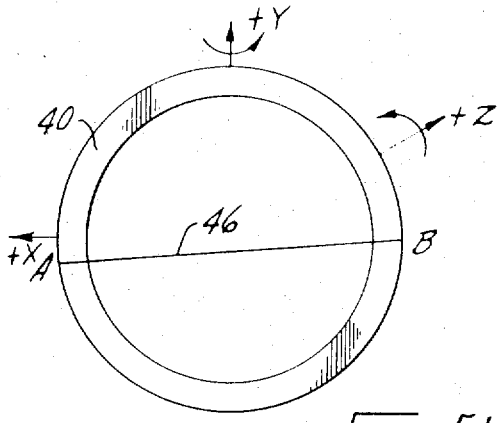

Indicated schematically at 45 is a supply reel or drum from which a plastic strand 46 is drawn. Referring to FIGS. 5a–5f, it will be seen that the ring 40 has a vertical axis Y and a horizontal center line X indicated by the arrowhead lines in FIG. 5a. The ring 40 also has a central, horizontal axis Z. As seen in FIG. 5b, the strand 46 is first wound across the ring 40 at a point extending from its initial point of engagement with the ring 40, indicated at A, to a point at the opposite side of ring 40, the latter point being indicated at B.

Figure 5C:
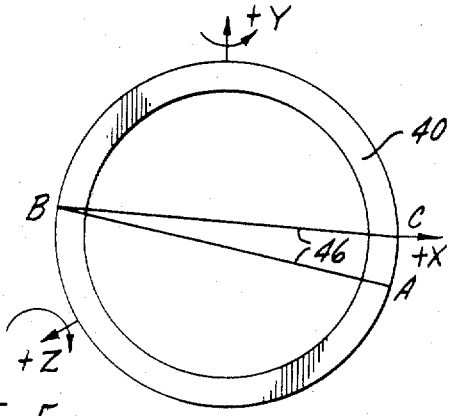
Figure 5D:
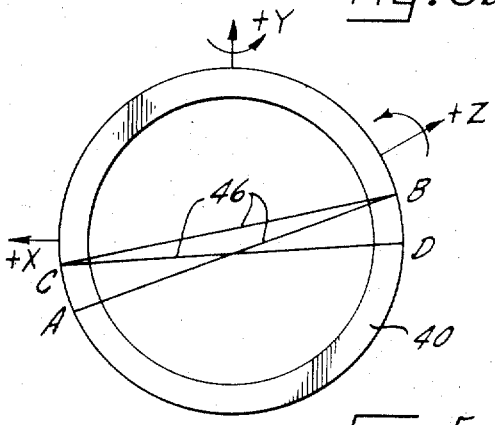
Figure 5E:
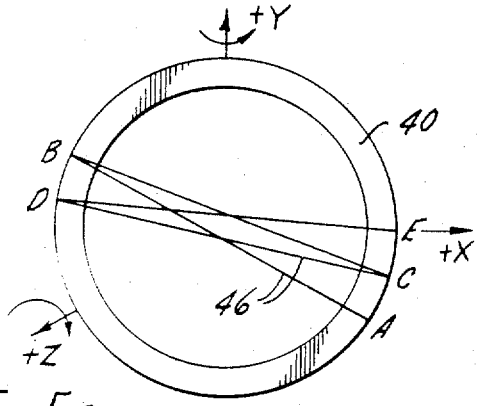

It will be understood that the ring 40 is first set in grooves 19 of wheels 16, 17. Shaft 6 is then lowered to seat ring 40 also in a corresponding groove 19 in wheel 18. The approach end of the strand 46 is then initially secured to an annular surface of the ring 40 at the point in any suitable manner, as by, for example, a piece of adhesive material (not shown) pressed thereagainst by the operator before the structure illustrated in FIG. 1 is activated. When activated the plate 15 and shaft 6 are simultaneously rotated at uniform speed controlled by shaft 10 to rotate the ring 40 about its vertical axis Y. The strand 46 is thus drawn off reel 45 and wound about the ring 40. When the ring 40 is rotated about its vertical axis Y it is also simultaneously rotated in response to rotation of wheels 16, 17, in timed relationship controlled by the gearing illustrated in FIGS. 2 and 3, about its horizontal axis Z. Thus as seen in FIG. 5c, the strand 46, which continues to be wound about the ring 40, is caused to engage the opposite edge of ring 40 from the point B at a point spaced from the point A as indicated at C. As ring 40 continues to rotate about its vertical axis Y, FIGS. 5d and 5e indicate continued windings of the strand 46 about the ring 40 at spaced points produced on the periphery thereof by rotation about its horizontal axis Z, the additional points being indicated at D and E.

Figure 5F:
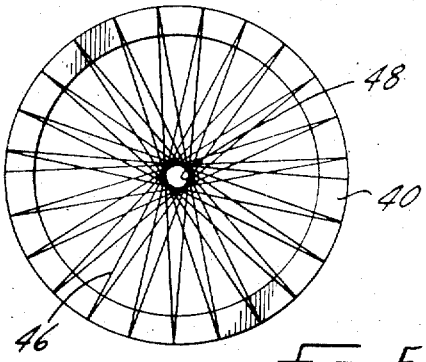

FIG. 5f illustrates completion of the step of winding the strand 46 on the pattern ring 40. It will be observed that a central opening or clear area 48 is produced by the windings described, the purpose of which will appear below. The said opening 48 is produced by initially winding the strand 46, as indicated in FIG. 5b, at a point offset from the center line X of the ring 40 and the continuous winding thereafter of the strand 46 in paths extending across the ring 40 in offset relationship with the center line X as may be clearly seen in FIGS. 5c–5e. The angle at which strand 46 approaches ring 40 from reel 45 can be initially set to assure the winding of the strand continuously in the desired offset relationship with center line X as the ring 40 is simultaneously rotated about both its vertical and horizontal axes.

It will be understood that the number of windings, and thus the number and density of radial strands such as those shown in FIG. 5f, can be controlled by adjusting the relationship between the speeds of rotation of ring 40 about its vertical and horizontal axes. When the desired number of windings has been achieved, the mechanism of FIG. 1 is stopped. This step can be accomplished by presetting control mechanism 20 to provide for a predetermined number of revolutions of ring 40 about both its vertical and horizontal axes. The operator then seals the last portion of strand 46 to approach ring 40 by any suitable means, such as a small piece of adhesive material (not shown) and severs the strand 46 adjacently beyond ring 40.

Referring again to the drawings, a vacuum or suction holder plate 50 is illustrated in FIGS. 6–9d. The plate 50 has a relatively flat undersurface 51. A plurality of suction openings 52 is circumferentially spaced about a center post 53 extending from the surface 51. The openings 52 communicate with a vacuum or suction chamber 54 within plate 50 and a vacuum or suction line 55 communicates with the chamber 54 from the opposite side 56 of plate 50. A positive pressure passage 57 is formed in a fitting 58 which extends through the plate 50, the passage 57 continuing through extension 53.

Figure 8:
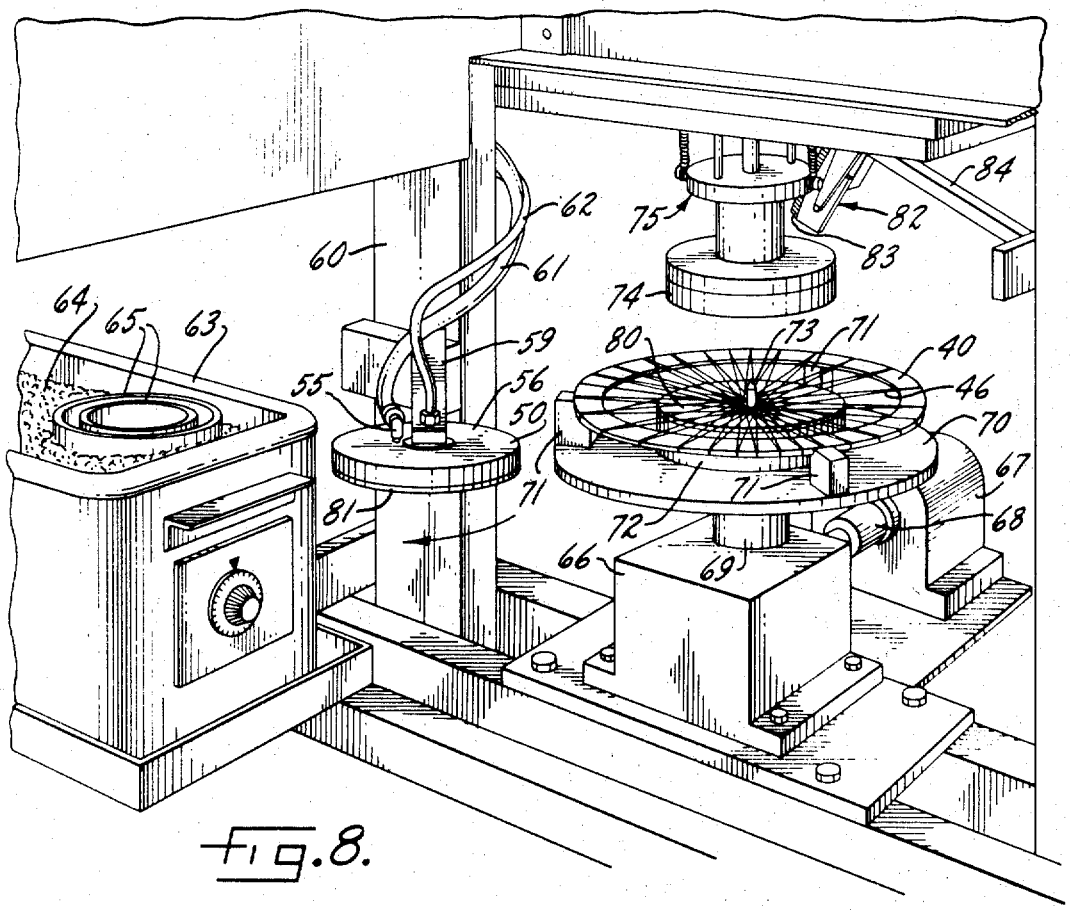
FIG. 8 is a perspective view of a structure effective for continuance of the method of the invention and for completing the manufacture of the device.

Referring now to FIG. 8, it will be observed that the plate 50 is carried by an arm 59 which is in turn pivotally supported on a frame 60. A suitable vacuum or reduced pressure line 61 is secured to and communicates with the vacuum fitting 55 shown in FIG. 7, and with a suitable source (not shown) of reduced or vacuum pressure. A positive pressure line 62 is secured to fitting 58 and communicates with passage 57 therein, the line 62 communicating at its opposite end with a suitable source (not shown) of positive or direct pressure.

Positioned adjacent the frame 60 is a hot melt pot member 63 in which a supply 64 of adhesive is maintained in a fluid state. A pair of concentric glue rings is indicated at 65. It will be understood that the glue rings 65 are immersed, by any suitable mechanism (not shown), in the bath 64 and are raised to a position similar to that illustrated in FIG. 8 periodically as the plate 50 is rotated into position above the rings 65.

Mounted on the frame 60 is a gear box 66. A power drive mechanism 67 rotates a shaft 68 which extends into the box 66 and which engages, by suitable gearing (not shown), an upstanding shaft 69 on which a turntable 70 is mounted. The turntable 70 has a plurality of block elements 71 positioned in circumferential spaced relationship about its periphery for reception of the ring 40 with the windings of strand 46 thereon. A block 72 is upstanding centrally of the plate 70 and a centering pin 73 rises centrally from the block 72. A press plate 74 is rotatably carried on frame 60 above block 72 by a suitable reciprocating mechanism shown generally at 75.

As may be best seen in FIG. 8, the operator first places a circular paper disc 80 on the block 72, the disc 80 having a central aperture fitting over the centering post 73. The operator then places ring 40, with the windings of strand 46 thereon, in the reception blocks 71, insuring that the centering post 73 passes through the open center 48 formed by the windings of strand 46 as referred to above and as shown in FIG. 5f. Thereafter the operator places a second, centrally apertured, paper disc 81 beneath the plate 50, centering the same thereon by insuring that the extension 53 passes through the central aperture in the paper disc 81, it being understood that discs 80, 81 are identical. As the operator places the disc 81 beneath the plate 50 the vacuum created at openings 52 is effective to retain paper disc 81 on the surface 51 of plate 50.

As may be best seen in FIGS 9a–9d, the plate 50 is rotated with its arm 59 to position plate 50 and disc 81 above the glue rings 65. The glue rings 65 then rise to transfer suitable adhesive from the supply 64 to the exposed surface of disc 81. As the glue rings 65 return, away from disc 81 and into the bath 64, suitable control mechanism (not shown), which may be associated with mechanism 20 for example, is effective to activate the direct pressure source to deliver fluid pressure through passage 57 and thus to break any bubble or film of glue which might extend across the exposed surface of disc 81 within the area of rings 65.

Figure 9A:
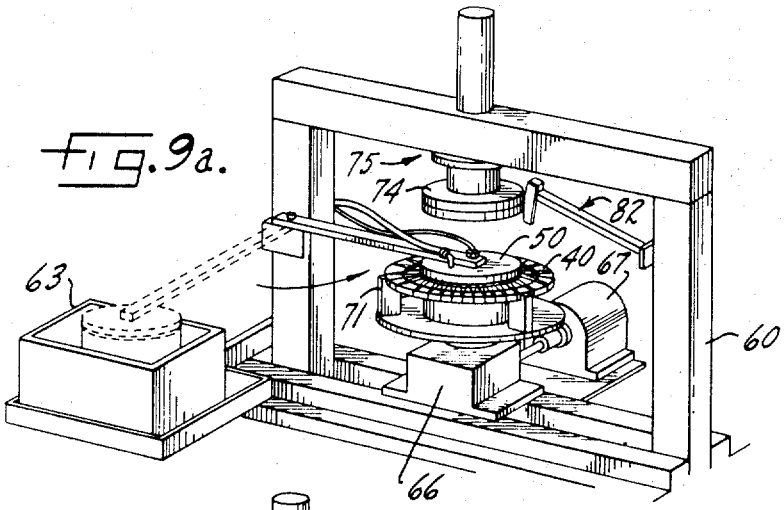
FIGS. 9a–9d are perspective views illustrating sequentially various steps in the operation of the structure illustrated in FIG. 8.
Figure 9B:
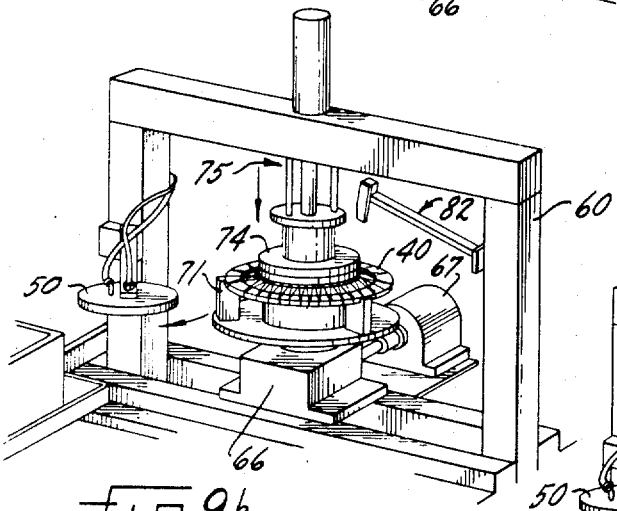

With the disc 81 held on its surface 51 by suction at openings 52, the plate 50 is then rotated from the dotted line position to the full line position shown in FIG. 9a to place the paper disc 81 above ring 40. The vacuum at opening 52 is then deactivated and the disc 81 seats on the windings above disc 80 with the center post 73 penetrating the central opening in disc 81. As best seen in FIG. 9b, the plate 50 is then rotated out of position and press plate 74 is moved downwardly over disc 81 to press the discs 80, 81 together and to secure those portions of the windings on ring 40 which are between the discs 80, 81 in the position shown, for example, in FIGS. 8 and 5f. The adhesive carried by disc 81 secures discs 80, 81 together and also secures the strand portions between discs 80, 81 to both discs and to each other. It will be understood that the press 74 has a central opening for reception of the centering pin 73.

Figure 10:
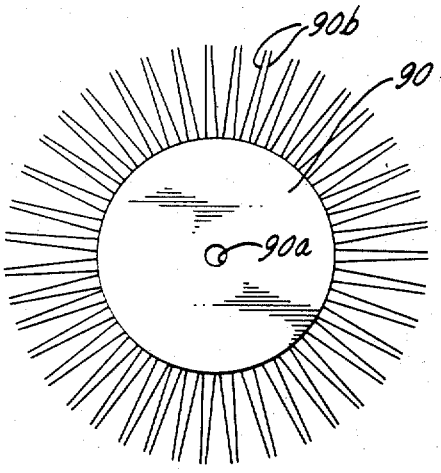
FIG. 10 is a top plan view illustrating a finished wire impedance element formed in accord with the inventions herein.
Figure 9C:
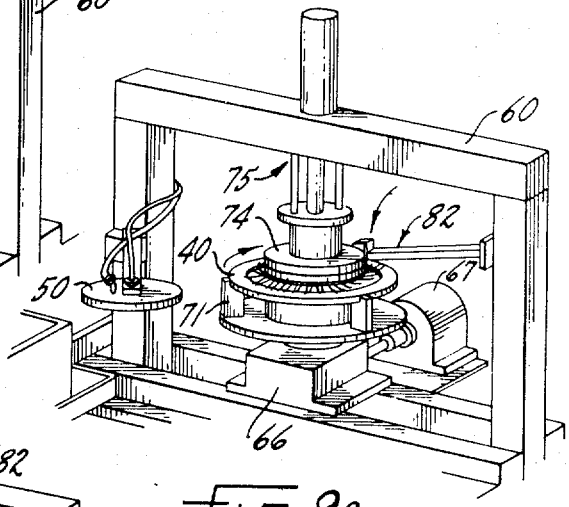
Figure 9D:
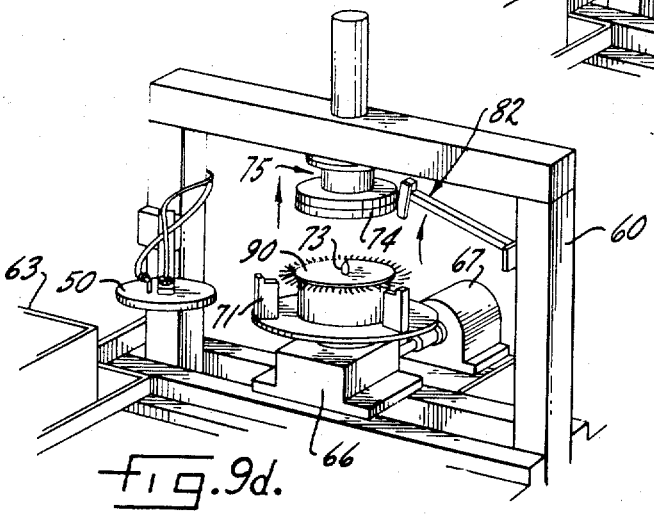

As may be best seen in FIG. 9c, a suitable cutter mechanism is moved into engagement with the windings of strand 46 on the ring 40, the cutter mechanism being shown generally at 82. While any suitable cutter mechanism may be provided, the numeral 83 indicates a knife edge carried by an arm 84 pivoted on frame 60. The knife edge 83 is moved into engagement with the strands of winding 46 on ring 40 immediately adjacent the inner edge of ring 40. With the press 74 remaining in pressed position against block 72, power mechanism 67 is activated to rotate shaft 69, plate 70, block 72 and press 74 and thus to rotate with plate 70 the ring 40 to sever all of the windings of strand 46 from the ring 40. As may be best seen in FIG. 9d, press 74 is then raised, ring 40 is removed from block 71 and the wire impedance element 90 is removed from block 72 and centering pin 73, the element 90 being illustrated in top plan view in FIG. 10.

Figure 11:
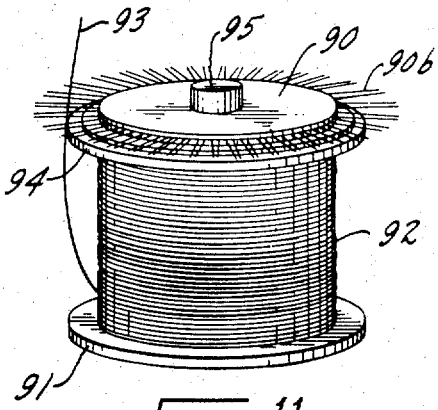
FIG. 11 is a perspective view illustrating the device of FIG. 10 in use.

FIG. 11 shows the impedance element 90 in use upon a spool 91 having a length of wire wound thereon as indicated at 92, 93 indicates an end portion of wire 92 which is being unwound from spool 91 over an end wall 94 of spool 91. The impedance element 90 is secured to the outer surface of end wall 94 by any suitable means, such as the member 95 which may extend through the central opening 90a of the element 90 to engage central socket, for example, in the wall 94. It will be observed that the substantially radially extending fingers 90b formed of the flexible plastic strand 46 extend beyond the periphery of wall 94 and that the wire portion 93 being remove from spool 91, as it traverses the periphery of wall 94 is impeded by fingers 90b. Such impedance is insufficient to restrict the removal rate of the wire 93, the finger 90b bending easily in response to movement thereagainst of the wire 93, but said impedance is sufficient to preclude raveling or distortion of wire portion 93 at it is removed from winding 92 on spool 91.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention. The scope of the invention should, therefore, be limited only by the scope of the hereinafter appended claims.

I claim:

1. For use in forming a wire impedance element, a frame, a turntable rotatible on said frame, means for rotating said turntable, a vacuum plate pivotally mounted on said frame, an adhesive applicator bath adjacent said frame, said plate being pivotable between a position overlying said bath and a position overlying said turntable, said vacuum plate having suction nozzles circumferentially spaced on a surface thereof, a press mounted for reciprocation and rotation on said frame, said press being movable toward and away from said turntable, and a cutter element piovted on said frame for movement into and out of the area adjacent said turntable.

2. The structure of claim 1 characterized by and further including a pressure nozzle positioned substantially axially of said vacuum plate and open in the direction of said suction nozzles.

3. The structure of claim 1 characterized by and including a disc-centering post extending axially from said vacuum plate.

4. The structure of claim 3 characterized by and including a fluid pressure nozzle extending through said centering post.

5. The structure of claim 1 characterized by and including an applicator element reciprocal into and out of said bath and toward and away from said plate when said plate is positioned over said bath.

References Cited

The following references, cited by the Examiner, are of record in the patented file of this patent or the original patent.

UNITED STATES PATENTS

| | | | |
|---|---|---|---|
| 3,104,839 | 9/1963 | Krupp et al. | 156—175 |
| 3,425,647 | 2/1969 | Kovaleski et al. | 242—128 |
| 3,323,960 | 6/1967 | Brown | 156—173 |
| 1,560,862 | 11/1925 | Roberts | 156—250 X |
| 2,262,461 | 11/1941 | Manrodt | 156—539 |
| 3,023,135 | 2/1962 | Wiltshire | 156—446 X |
| 745,381 | 10/1964 | Eddison et al. | 156—572 X |

FOREIGN PATENTS

| | | | |
|---|---|---|---|
| 745,381 | 5/1933 | France | 156—510 |

BENJAMIN A. BORCHELT, Primary Examiner

J. M. HANLEY, Assistant Examiner

U.S. Cl. X.R.

156—250, 173